A. SUNDH.
ELECTROMAGNETICALLY CONTROLLED POWER TRANSMISSION MECHANISM.
APPLICATION FILED MAR. 6, 1909.
1,047,329.
Patented Dec. 17, 1912.
6 SHEETS—SHEET 6.
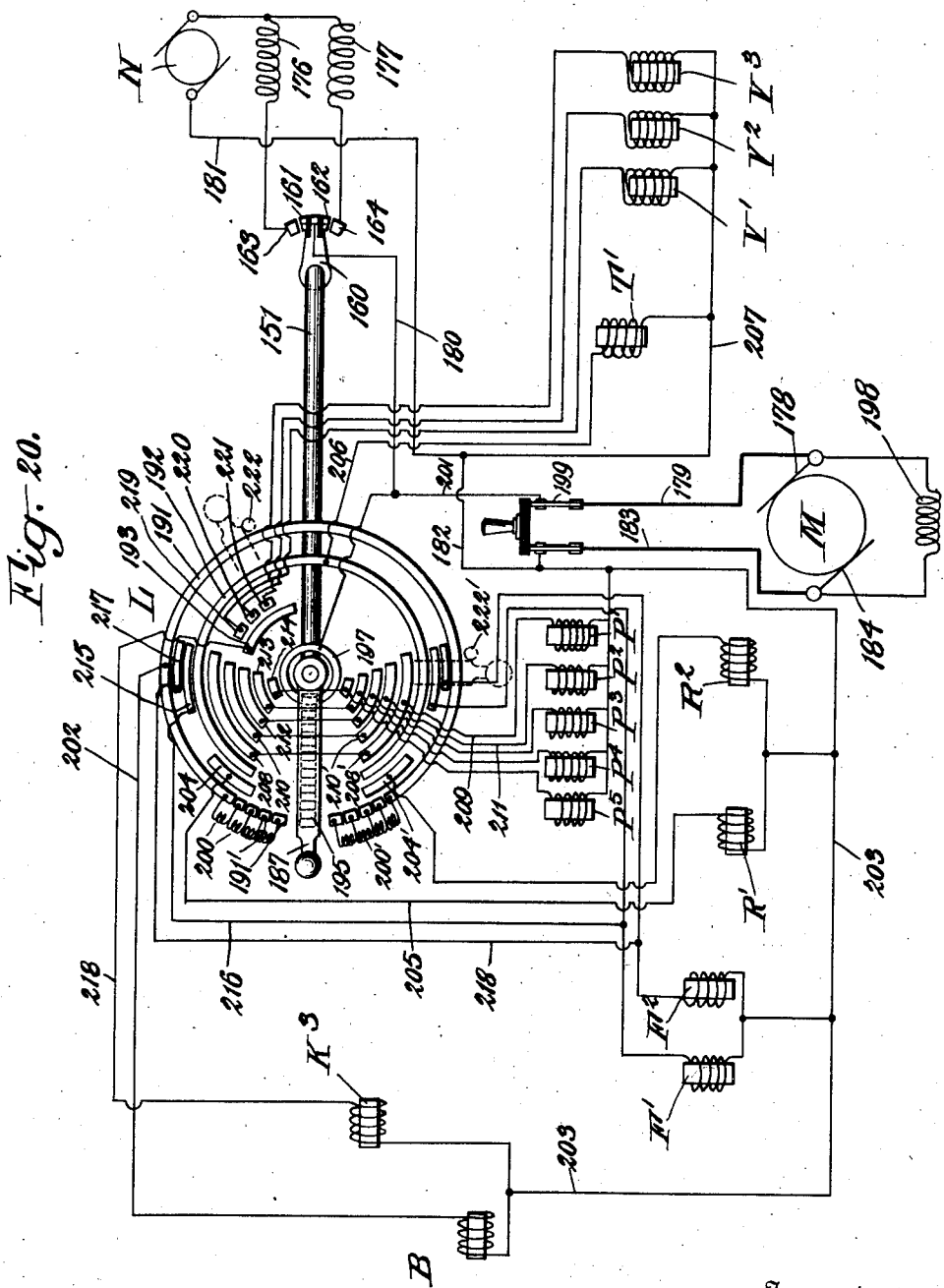

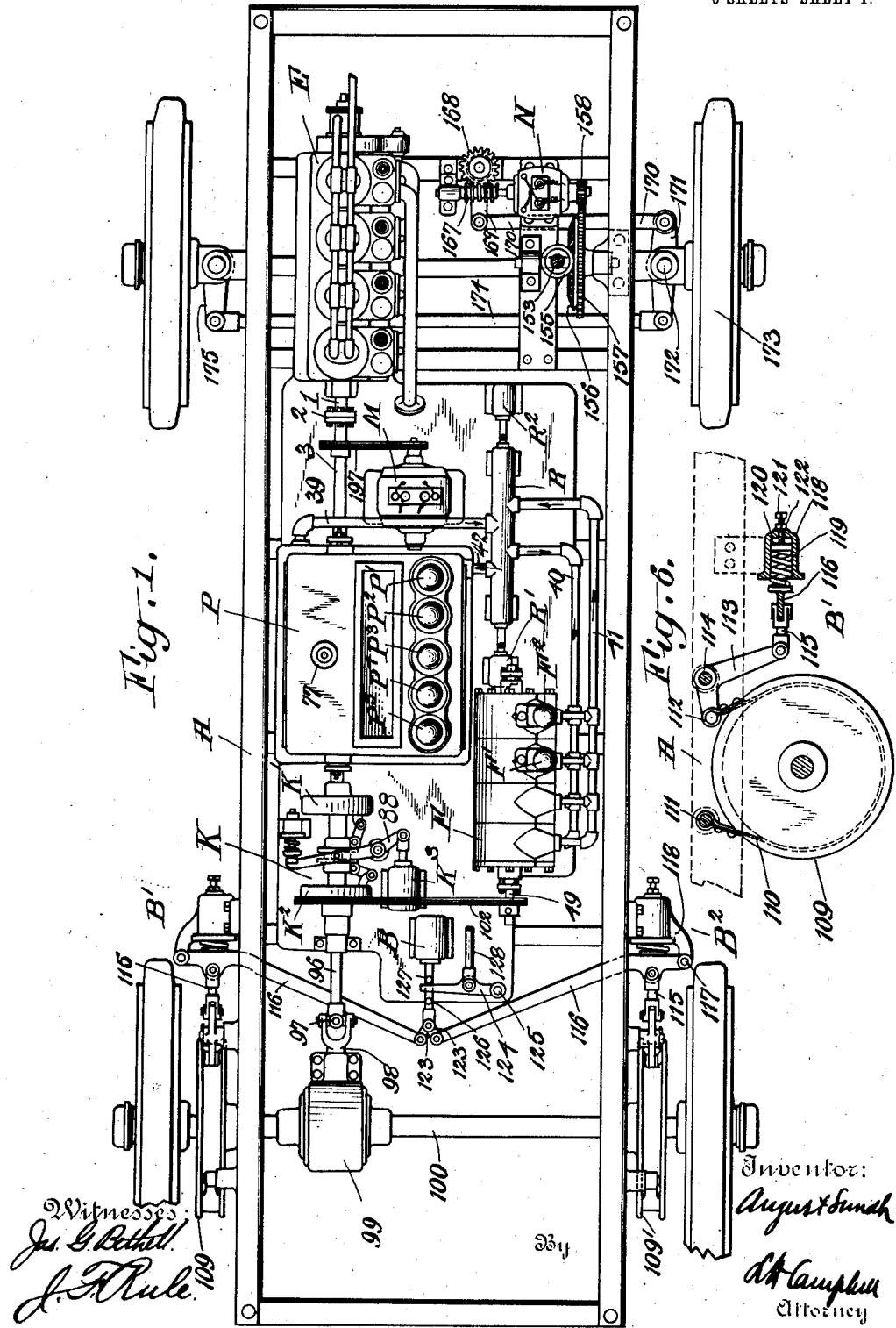

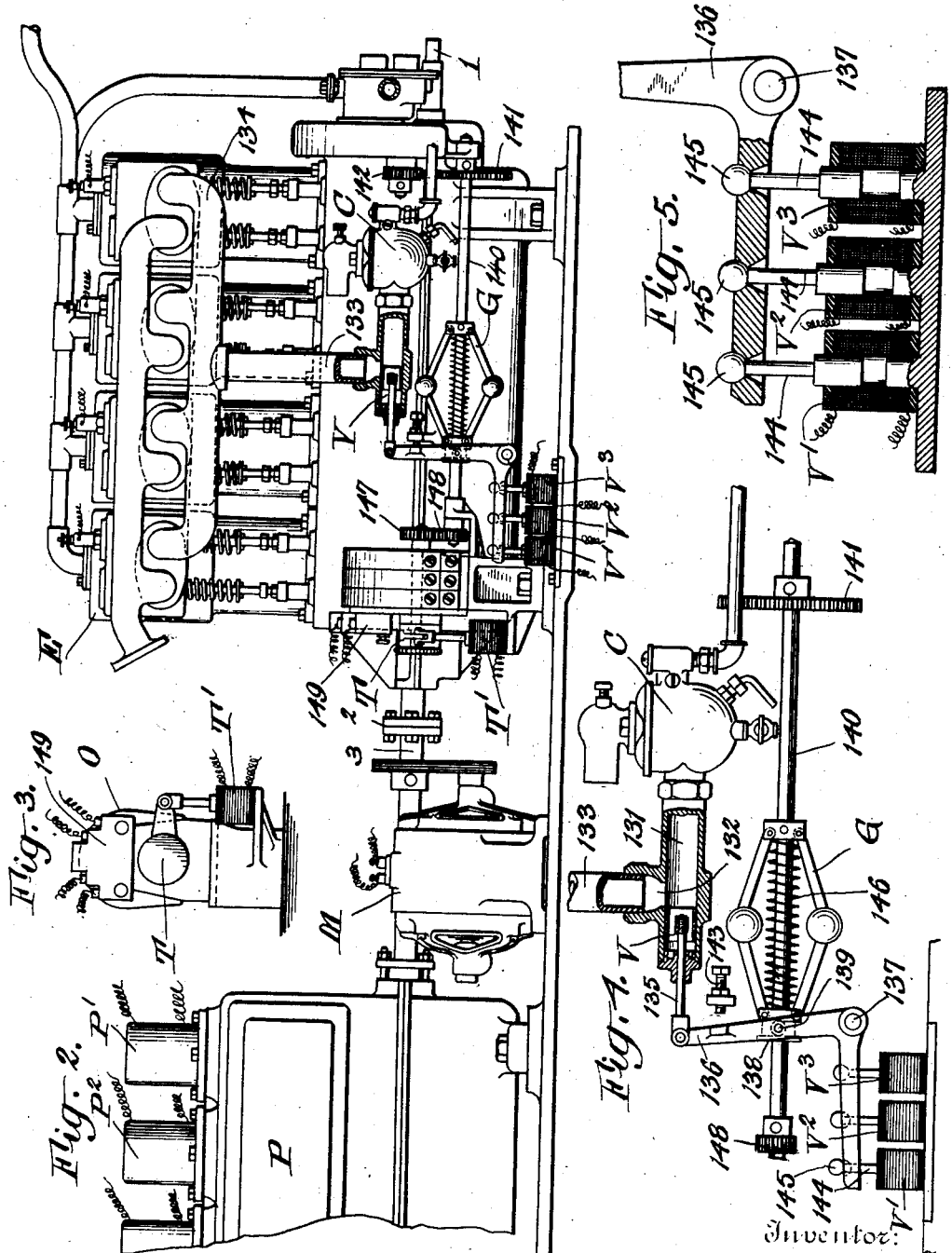

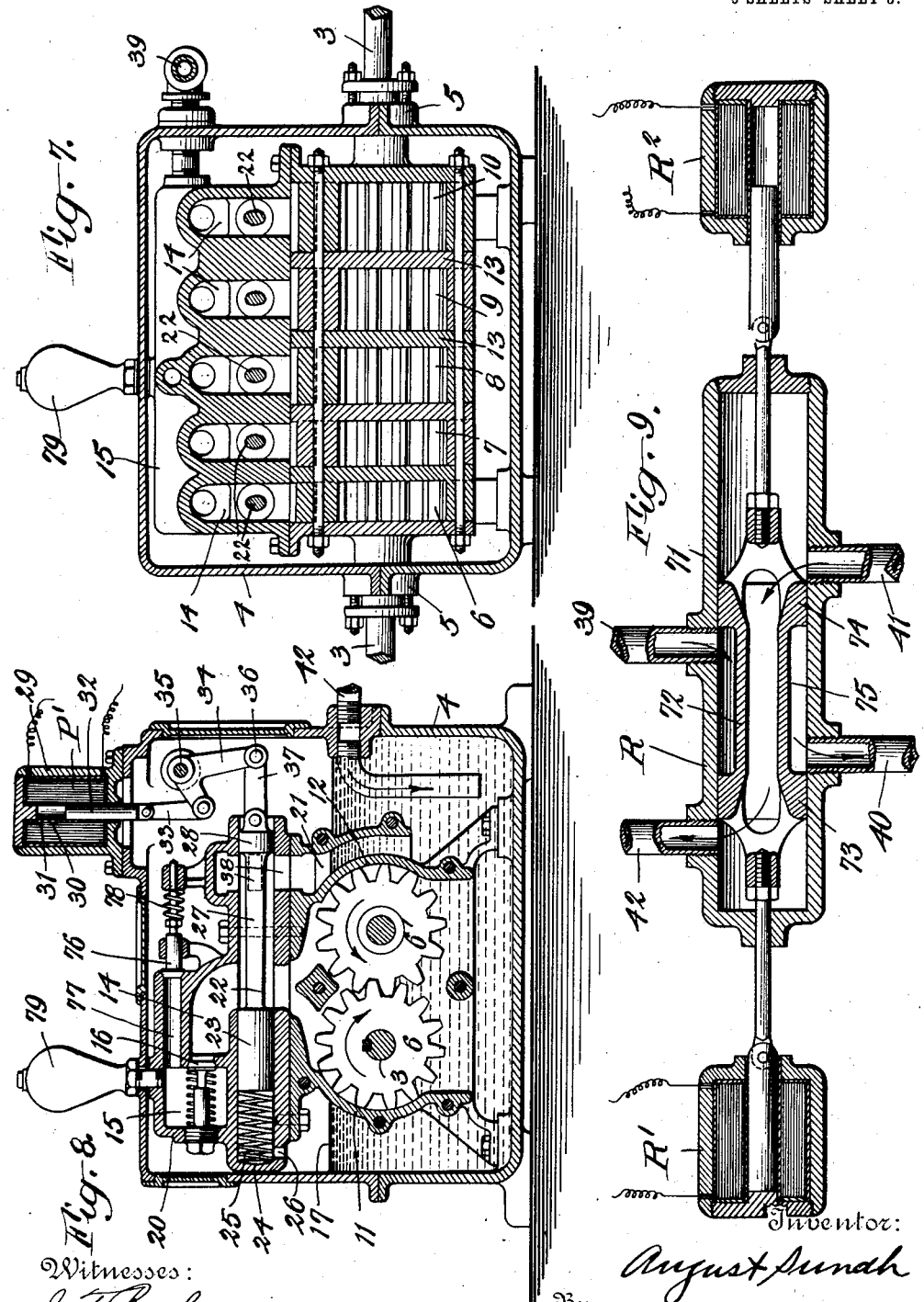

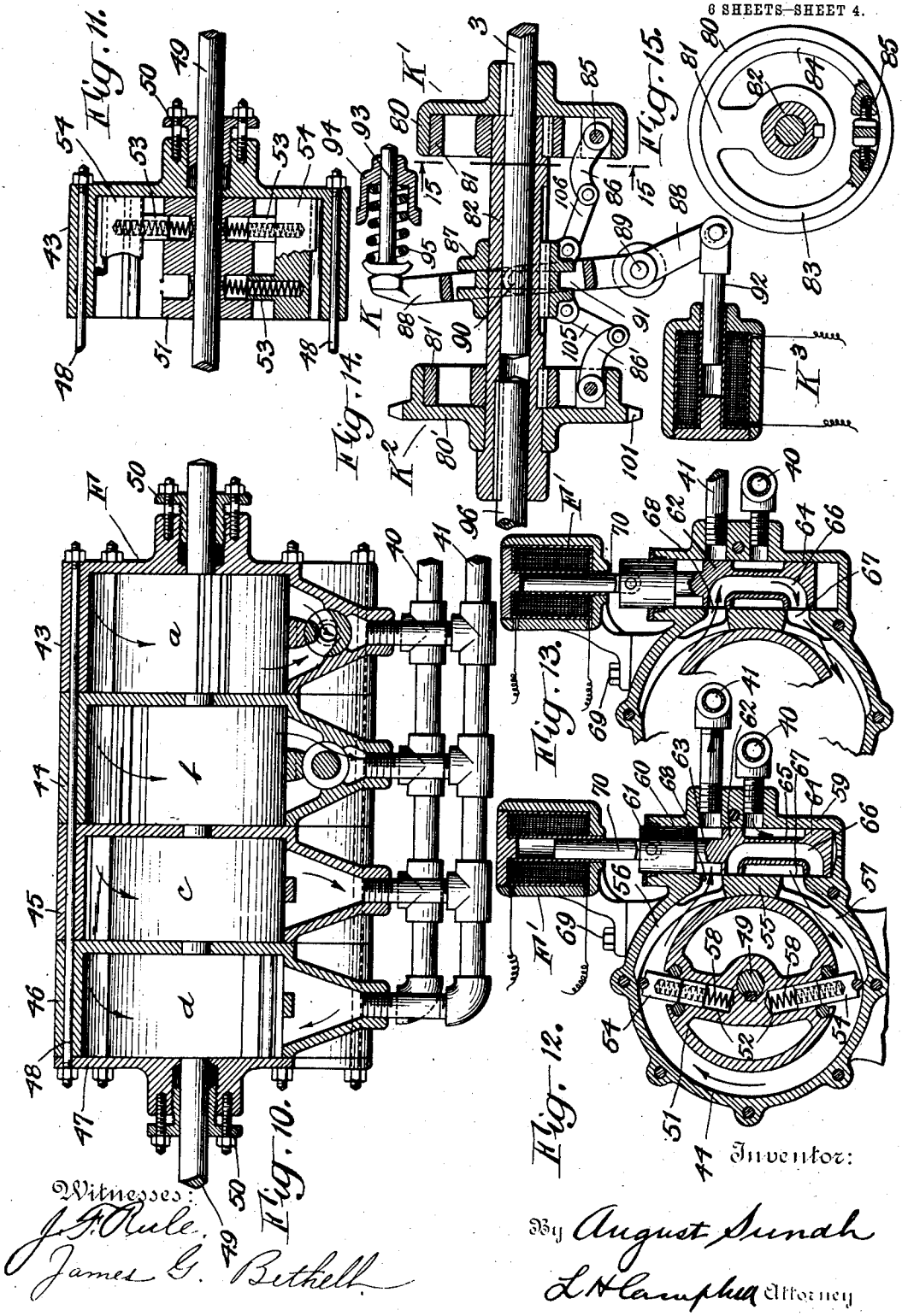

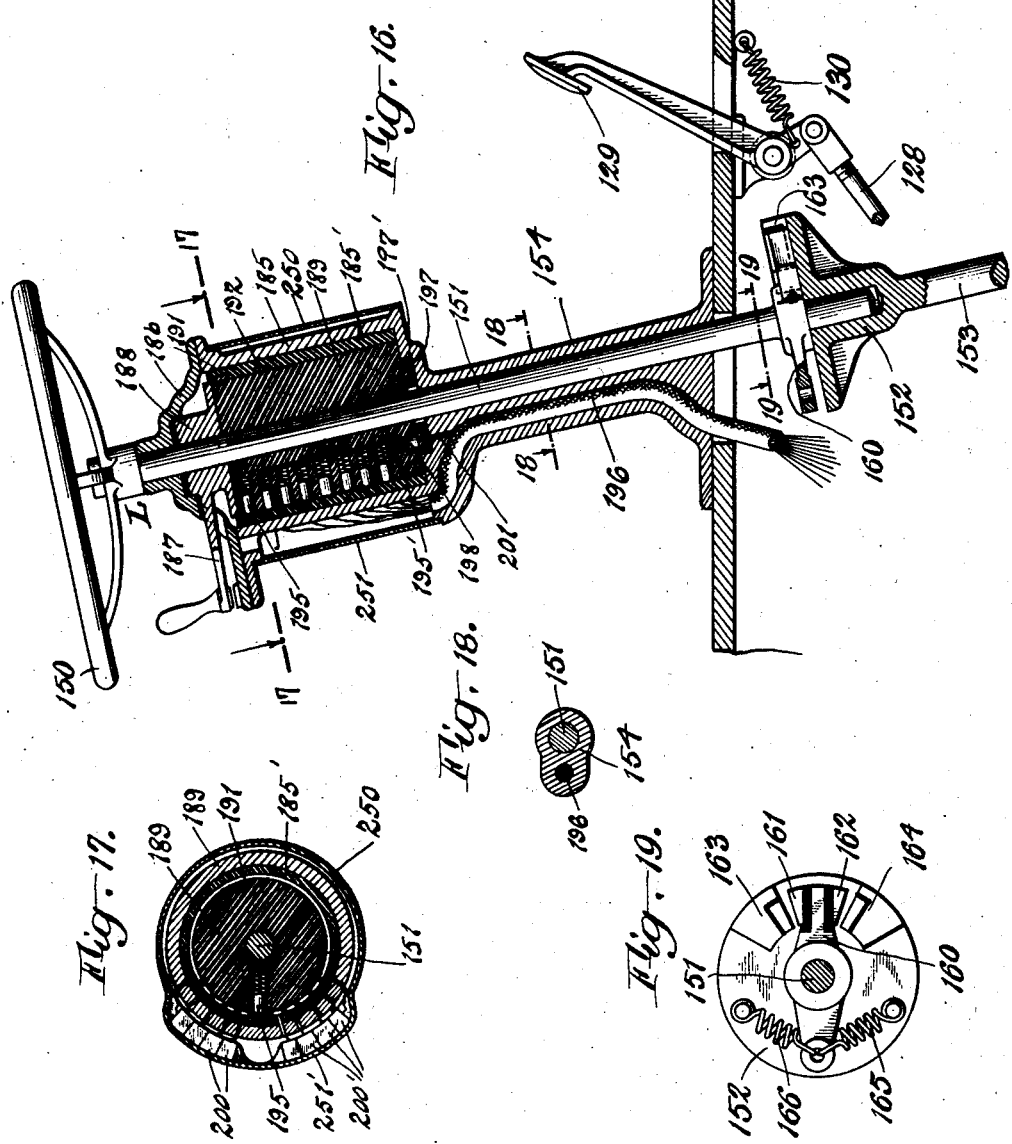

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

ELECTROMAGNETICALLY-CONTROLLED POWER-TRANSMISSION MECHANISM.

1,047,329.  Specification of Letters Patent.  Patented Dec. 17, 1912.

Application filed March 6, 1909. Serial No. 481,839.

*To all whom it may concern:*

Be it known that I, AUGUST SUNDH, a citizen of the United States, residing at Yonkers, in the county of Westchester and State of New York, have invented a new and useful Improvement in Electromagnetically - Controlled Power - Transmission Mechanism, of which the following is a specification.

My invention relates to power transmission mechanism, and is especially adapted for use in connection with an internal combustion engine or engines. Mechanism for this general purpose is not broadly new, and the present invention aims to provide improved means for regulating and controlling the output of the engine more easily and more efficiently than has been done up to the present time.

The invention further provides means for controlling the speed of the prime mover in conjunction with means for regulating and controlling the power transmission mechanism.

Although the present invention is herein shown as used in connection with automobile trucks, it is to be understood that it is adapted for various other uses, as, for example, with railroad cars where it would be to advantage to use an internal combustion engine on one or more of the cars, and suitable power transmission mechanism to connect said engine with the driving wheels of the cars.

My invention may also be applied to torpedo boats and many other power installations.

As is well known, it is very inconvenient, laborious and unsatisfactory to have to start an explosive engine each time the machinery with which the engine is used is started, and even if auxiliary devices are used for this purpose they are not to be depended upon, and are often unsatisfactory, and defective in their operation. In the present system it is intended to permit the internal combustion engine to run while the automobile or other device is not in use, and only to slow down the engine when the driven machinery is stopped. I employ a hydraulic transmission gear interposed between the prime mover and the driven machinery, said hydraulic gear being adapted to permit the machinery to be started and stopped while the prime mover is running. The transmission gear also permits the speed and torque applied to the driven machinery to be varied inversely from a minimum to a maximum, or vice versa, whereby the machinery when driven is under perfect control without interfering with the running of the internal combustion engine. To obtain the best results and highest efficiency the system is provided with clutch mechanism so constructed and arranged that after the speed of the driven machinery has been accelerated by the fluid transmission mechanism, the driven machinery can be connected directly to the prime mover.

The invention further comprises brake apparatus arranged to be controlled in conjunction with the transmission gearing and adapted to be applied gradually at the will of the operator and also designed to be released or applied even if the transmission gearing is inoperative.

The invention further comprises various other features of novelty as disclosed in the accompanying drawings, and which will appear in the following description, the novel combinations of elements being set forth in the appended claims.

Referring to the accompanying drawings which illustrate one form of my invention as applied to an automobile truck, Figure 1 is a plan view of an automobile truck showing the general arrangement of a construction embodying the present invention as applied to said truck; Fig. 2 is a part sectional elevation of the internal combustion engine and controlling mechanism associated therewith, and also showing an electric generator and a portion of the pump; Fig. 3 is a detail view showing a magneto and a timer and distributer used in the control of the engine: Fig. 4 is a detail view showing a valve controlling the supply of fuel to the engine and controlling mechanism associated therewith; Fig. 5 is an enlarged detail of the controlling magnets shown in Fig. 4; Fig. 6 is a detail view of the brake mechanism; Fig. 7 is a sectional elevation of the pump; Fig. 8 is a sectional end elevation of the same, and also shows the construction of the valve mechanism controlling the circulation of fluid through the pump; Fig. 9 is a sectional view of the reversing valve and means for operating the same; Fig. 10 is a part sectional plan view of the fluid motor; Fig. 11 is a sectional view through one of the sections of said fluid motor; Fig. 12 is a sectional end elevation of the fluid motor and valve mechanism for controlling the circulation of fluid therethrough; Fig. 13 is a fragmentary view of the same, but showing the valve in a different position; Fig. 14 is a sectional view of the clutch mechanism; Fig. 15 is a section taken on the line 15—15 of Fig. 14; Fig. 16 is a sectional elevation of the steering apparatus and the electric controller; Figs. 17, 18 and 19 are sectional detail views taken on the lines 17—17, 18—18, and 19—19, respectively of Fig. 16; Fig. 20 is a diagrammatic view of the controlling devices and electric circuits therefor.

The general arrangement of parts as shown in Fig. 1, comprises a prime mover E, preferably an internal combustion engine, a pump P, coupled to the engine to be driven thereby; a fluid motor F adapted to be driven by fluid pressure supplied from the pump; a reversing valve R controlling the direction of flow of the fluid through the motor F; gearing connecting the motor F to the driving axle of the automobile; clutch mechanism K adapted to disconnect the motor F and connect the engine E to the driving axle independently of the fluid motor; brake mechanism B', B²; steering apparatus, and a motor N for operating the same. Electromagnets are employed for operating the valves controlling the pump and the fluid motor, and for operating the reversing valve, the clutch mechanism, brake mechanism, etc., and a small generator M geared to the engine E is adapted to furnish electric current for operating the various electromagnets.

The prime mover E is preferably a high speed internal combustion engine, the same being well adapted for use on automobile trucks, etc., as an engine of this type may be both powerful and light in weight. A high speed engine is well adapted for operating the type of pump herein shown. The engine E together with the transmission mechanism is carried by the frame A of the automobile. The shaft 1 of the engine is connected by a coupling 2 to a shaft 3 of the pump.

Referring to Figs. 7 and 8, it will be seen that a gear pump is employed. The driving shaft 3 of the pump extends through a casing 4, which contains the pumping mechanism and the valve mechanism controlling the latter. Stuffing boxes 5 of any preferred form may be employed to prevent leakage from the casing. Keyed to shaft 3 is a series of pump gears 6, 7, 8, 9 and 10, each of these gears meshing with a corresponding gear such as 6'. Each pair of gears is located in a separate compartment having end walls 11 and 12 curved to conform to the peripheries of the gear wheels as shown in Fig. 8. These several compartments are separated by the partitions or walls 13. Located above the pump gears is a casing 20 provided with a series of passages 14 communicating with the several compartments in which the gears are located. These passages 14 open into a pressure chamber 15 formed in the casing 20 and extending substantially the entire length of said casing. The circulating fluid 17 is preferably a light oil which has been found to be well adapted for use with this mechanism, and serves to lubricate the various parts. If desired, however, water or other liquid may be used. A spring pressed check valve 16 is provided for each passage 14, and serves to prevent the liquid from flowing backward toward the pump from the pressure chamber. Extending from each passage 14 is a by-pass 21 communicating with the intake side of the pump. Each of these by-passes is controlled by a balanced valve 22. This valve comprises the cylindrical portion 23, slidable in a recess 24, formed in the casing 20. The coil spring 25 holds the valve in its outward position as shown in Fig. 8, and a vent 26 serves to relieve the pressure behind the valve. The stem 27 of the valve extends through a cylindrical passage connecting the by-pass 21 with the passage 14, and at the right-hand end of the valve stem is a cylindrical head or piston 28 which serves, when the valve is moved, to the left, to close the said cylindrical passage between the passage 14 and the by-pass 21. An electromagnet P' is adapted to operate the valve 22. This magnet may be of any preferred construction. It is here shown comprising an outer casing of magnetic material, such as soft iron, and a central tube 30 on which is wound the magnet coil 31. The armature or core 32 of the magnet is adapted to be drawn up in the tube 30 when the magnet is energized. The various electromagnets used in the present invention, and as herein shown, are substantially like the one just described. The size and form of the magnets may be varied to secure the best results with the particular devices they are used to operate. It is to be understood also, that other forms of magnets may be used if desired. The core 32 of the magnet P' is connected by a link 33 to one arm of a bell-crank lever 34 pivoted at 35, the other arm of said lever being pivoted at 36 to a link 37, connecting said lever with the valve stem. When the electromagnet P' is excited its core is drawn up, and, through the connections just described, moves the valve toward the left and closes the valve ports 38, thereby cutting off the circulation of fluid through the by-pass. This movement of the valve compresses the spring 25, which, when the magnet is deënergized, serves together with the weight of the core 32 to return the valve to its open position. It is to be understood that valve mechanism like that just described is provided for each pair of pump gears. The magnets for operating these valves are designated P', P², P³, P⁴, and P⁵, respectively, and are adapted to be successively energized as will be fully described hereinafter.

The liquid is conveyed from the pressure chamber 15 through pipe 39 and to the reversing valve R. The latter is in communication with the fluid motor F through the pipes 40 and 41. The liquid after circulating through the motor F is returned to the reversing valve R, and from thence through a pipe 42 to the discharge chamber formed by the casing 4 of the pump. In order to prevent excessive pressure in the pressure chamber 15 from any cause, a relief valve 76 is provided. This valve normally closes a passage 77 leading from the pressure chamber and opening into the exhaust 4. An adjustable spring 78 serves to hold the valve normally closed, and may be adjusted to permit the valve to open whenever the pressure in the chamber 15 exceeds any predetermined limit. An air chamber 79 is located above and opens into the pressure chamber, and serves as a cushioning device to prevent any sudden changes in the pressure of the liquid, thereby insuring a smooth action of the parts, and preventing any sudden strain on the mechanism. This air chamber also serves to receive any air bubbles that may be drawn into the liquid by the pump.

The construction of the fluid motor F and the valve mechanism controlling the circulation of fluid therethrough is shown in detail in Figs. 10, 11, 12 and 13. The casing of the motor, as here shown, comprises four sections, 43, 44, 45 and 46, and an end plate 47, bolted together by bolts 48, and forming four compartments, $a$, $b$, $c$ and $d$. The driving shaft 49 extends longitudinally through the casing, and stuffing boxes 50 are provided to prevent leakage. In each of the compartments $a$, $b$, $c$, and $d$ is located a rotary driving member 51 keyed to the shaft 49. The construction of these rotary driving members is well known in the art, and need only be briefly described. The member 51 is provided with recesses 52 in which are slidable stems 53 secured to blades 54, which latter project beyond the cylindrical portion of the member 51, but are movable inwardly to a position within the periphery of said cylindrical portion. The casing within which the member 51 rotates is substantially circular in cross-section, as seen in Fig. 12. A section 55 of the casing lies in close proximity to the rotary member 51. Curved guides 56 and 57 extend from the part 55 to the upper and lower portions of the casing, respectively. The guide 56 serves to move the blade 54 gradually inwardly as it moves from its uppermost position to the right hand side of the casing, and guide 57 permits it to be gradually extended outwardly as the blade moves toward its lowermost position. Springs 58 serve to hold the blades outward at all times as far as the casing or said parts 56 and 57 will permit. Formed on a section 44 of the motor F is a valve casing 59, in which is adapted to reciprocate a balanced valve 60. This valve comprises an upper cylindrical portion 61, an intermediate portion 62, and stem 63 connecting said portions; also portion 64 and a stem or reduced portion 65 connecting the portions 62 and 64. A passage 66 is formed through the stem 65. The pipes 40 and 41 extend from the reversing valve R to the valve casing 59. When the valve 60 is in the position shown in Fig. 12, and fluid under pressure is conveyed from the pump through the pipe 40, it enters the valve casing 59 and circulates around the valve stem 65 and through the port 67 into the casing 44. The pressure of the liquid against the blade 54 rotates the member 51. The liquid in front of the upper blade 54 is forced through the port around the valve stem 63, into the pipe 41, and back to the reversing valve and pump. The member 51 is thus rotated to drive the shaft 49.

An electromagnet F' which may be secured to the pump casing by bolts 69, is adapted to operate the valve 60. The core 70 of the magnet is connected to the valve and when the magnet is energized, lifts the valve from the position shown in Fig. 12, to the position shown in Fig. 13. In this position the passage 66 formed through the valve establishes direct communication between the intake port 67 and outlet port 68 of the motor. The part 62 at this time closes the pipe 41 and communication between the pipe 40 and intake 67 is also cut off. When the magnet F' is excited therefore, fluid is permitted to circulate freely within the section 44 of the motor, and through the passage 66, without exerting any driving action on the motor. Similar valve mechanism is provided for the section 43 and adapted to be operated by magnet F². The fluid motor F may have any desired number of sections, and valve mechanism may be applied to as many of these sections as desired. The purpose of these valves in connection with the motor is fully set forth hereinafter.

The direction in which the liquid is circulated through the motor F, and consequently the direction in which the latter is rotated, is controlled by the reversing valve R (see Figs. 1 and 9). This valve comprises a cylindrical casing 71 in which the valve member 72 is adapted to reciprocate. The part 72 comprises end portions or pistons 73 and 74 connected by a hollow stem 75, permitting the free circulation of the fluid through the member 72. With the valve in the position shown, the liquid from the pressure pipe 39 can circulate around the stem 75 and into the pipe 40, and from thence to the motor F. The exhaust fluid from the motor F flows through the pipe 41 and through the interior of the valve member 72 to the pipe 42, which leads to the exhaust chamber 4. As the valve member 72 is moved to the right the parts 73 and 74 cover the pipes 40 and 41, respectively, and cut off the circulation of fluid through the reversing valve. The continued movement of the member 72 to the right connects the pipe 41 with the pressure pipe 39, the fluid now circulating around the stem 75. The pipe 42 is also connected directly to the pipe 40. The direction in which the liquid circulates through the motor F is therefore reversed, causing a reversal of the motor. Electromagnets $R'$ and $R^2$ are adapted to move the valve member 72 to its left and right hand positions, respectively.

Referring to Figs. 1, 14 and 15, the clutch mechanism K which is adapted to connect the driving axle of the machine either to the fluid motor F or to the engine E independently of said motor, will now be described. This clutch mechanism comprises two clutches, $K'$, $K^2$. The clutch $K'$ comprises an outer member 80 and an inner member 81. The member 80 is in the form of a flanged disk, and is keyed to the shaft 3 of the pump. A sleeve 82 is loosely mounted on the shaft 3, and extends within the clutch member 80. The inner clutch member 81 is keyed to the sleeve 82, and comprises two resilient arms 83 and 84, adapted to move into and out of frictional engagement with the inner surface of the flange formed on the member 80. A short rod 85 is provided with right and left hand screw threads at its ends engaging correspondingly threaded recesses in the ends of the arms 83 and 84. A crank arm 86 is secured to the rod 85, and adapted to rotate the latter into position to engage and release the clutch members. The clutch $K^2$ is similar in construction to the clutch $K'$, and comprises outer and inner members $80'$ and $81'$. The member $80'$ is loosely mounted on the sleeve 82, and the member $81'$ is keyed to the sleeve 82. The clutch members $80'$ and $81'$ are moved into and out of contact by means of the crank arm $86'$. The sleeve 87 is splined on the sleeve 82, so as to be movable longitudinally thereof, but is prevented from rotating independently of the sleeve 82. A bifurcated lever 88 pivoted at 89 straddles the sleeve 87, and is provided with pins 90 extending into the annular recess 91 formed in the sleeve 87. One end of the lever 88 has a slot and pin connection with the core 92 of an electromagnet $K^3$. The opposite end of the lever 88 bears against the head of a pin 93, slidable in a cup-shaped bracket or stop 94. A coil spring 95, surrounding the pin 93 and bearing at its opposite ends against the head of the pin and bracket 94, respectively, serves to move the lever 88 into the position shown in Fig. 14, when the magnet $K^3$ is deënergized. The left hand end of the sleeve 82 is keyed to a shaft 96 extending rearwardly from the clutch mechanism, and connected by a universal coupling 97 to a shaft 98 extending within the gear casing 99 mounted on the rear axle of the machine. The shaft 98 is geared in any suitable manner within the gear casing to the driving axle 100. The member $80'$ of the clutch $K^2$, is formed with sprocket teeth 101. A sprocket chain 102 connects the member $80'$ with a sprocket pinion on the rear end of the shaft 49 of the fluid motor F.

With the clutch mechanism in the position shown in Figs. 1 and 14, the members of the clutch $K^2$ are in frictional engagement, so that when the fluid motor F is operated, the sprocket chain 102 drives the clutch $K^2$, thereby rotating the sleeve 82 and the shaft 96, the latter imparting movement to the driving axle 100. The members of the clutch $K'$ at this time are disconnected, so that the pump shaft 3 may rotate freely within the sleeve 82. When the electromagnet $K^3$ is excited its core 93 is drawn inwardly and operates the lever 88, thereby compressing spring 95 and moving the sleeve 87 to the right. This movement of the sleeve 87 operates through the links 105, and 106, to disconnect the members of the clutch $K^2$, and connect the members of the clutch $K'$. The member $80'$ of the clutch $K^2$ can now rotate freely on the sleeve 82, so that no power is transmitted from the axle of the fluid motor F to the driving axle 100. The connection of the members of the clutch $K'$ causes the sleeve 82 to rotate with the pump shaft 3, the sleeve 82 in turn driving the shaft 96, so that the engine E is connected through the pump shaft 3, and shaft 96, with the driving axle. In other words when the clutch magnet $K^3$ is excited, the engine E is connected to drive the machine independently of the fluid motor F, and when the clutch magnet is deënergized, the engine can only operate through the liquid circulating in the pump and fluid motor to drive the machine.

The brake mechanism shown in Figs. 1 and 6, will now be described. Secured to the driving axle 100 are brake pulleys 109 and $109'$. As the construction of the brake mechanism for each brake pulley is substantially the same the description of one will suffice for both. Referring to Fig. 6, a brake strap 110 is connected at 111 to the frame A of the machine. This brake strap extends around the brake pulley, and its opposite end is connected at 112 to a bell crank lever 113, pivoted at 114. The lower end of the bell crank lever is connected by a link 115 to a lever 116. The outer end of the lever 116 is pivoted at 117 to a bracket 118 bolted to the frame A. This bracket is formed with a cup-shaped member in which is located a coil spring 119, the outer end of which bears against the lever 116. The inner end of the spring 119 bears against the stop 120 in the bracket 118. A set screw 121 serves to adjust the position of the stop 120, and thereby adjust the tension of the spring. A set nut 122 may be provided to hold the set screw in its adjusted position. As shown in Fig. 1, the levers 116 are connected to the core of an electromagnet B by means of links 123. When the magnet B is deënergized the springs 119 exert a pressure on the levers 116 which is transmitted through the links 115 and bell crank levers 113, and serves to hold the brake straps applied to the brake pulleys. When the brake magnet B is excited it operates to draw the inner ends of the levers 116 forward, compressing the brake springs 119, and moving the bell crank levers into position to release the brake straps from the brake pulleys. A device for manually applying the brake independently of the brake magnet is also provided. This device comprises a lever 124 pivoted at 125. The free end of the lever extends between pins 126 and 127 carried by the core of the brake magnet. A link 128 is pivoted to the lever 124 and extends to the forward part of the machine as shown in Fig. 16. The forward end of this link is connected to a foot lever 129, located in any convenient position for operation. A coil spring 130 connected to the foot lever serves to hold it normally in its upper position. The pins 126 and 127 are so located with respect to the lever 124 that the core of the brake magnet B may be moved in or out without disturbing the foot lever 129. When the foot lever is depressed the lever 124 will exert pressure against the pin 126, and serve to apply the brakes. If the brake magnet is at this time deënergized, and the brakes are already applied, the braking action may be increased by pressure on the foot lever. The latter may also be operated in opposition to the brake magnet if desired, as for example, in case of an emergency, when it is desired to quickly apply the brakes.

By reference to Figs. 2, 4, and 5, it will be seen that the supply of fuel transmitted through the carbureter C to the combustion chambers of the engine, is regulated and controlled by the valve V. The carbureted fuel passes from the carbureter through pipe 131, port 132, and vertical pipe 133, to the horizontal pipe 134, which distributes the fuel to the combustion chambers of the engine. The valve V may be moved over the port 132 to a greater or less extent, to correspondingly restrict the passage of the fuel therethrough. The valve stem 135 is connected to a bell crank lever 136, pivoted at 137 to a stationary support. A centrifugal governor G, which as here shown, is of a well known construction, comprises a sleeve 138 for operating the bell crank lever 136 by means of a pin 139 carried by the lever, and engaging the sleeve 138. The governor is carried by a shaft 140, to which is keyed a gear wheel 141, meshing with a pinion 142, geared in any convenient manner to the shaft 1 of the engine. The governor is therefore operated in a well understood manner to move the valve V into positions corresponding to the speed of the engine E. An adjustable stop 143 in the path of movement of the bell crank lever serves to limit the inward movement of the valve so that the governor G cannot operate to entirely cut off the supply of fuel. Additional mechanism for controlling the valve V comprises a series of electromagnets $V'$, $V^2$ and $V^3$. The cores of these magnets are each provided with a stem 144, which extends upward through an opening in the horizontal arm of the bell crank lever and is formed at its upper end with a knob 145. When the valve V is in its forward position, with the bell crank lever bearing against the stop 143, the cores of the electromagnets are held in their upper position as shown in Fig. 5. The electromagnets are adapted to be energized successively to operate the lever. When the electromagnet $V'$ is excited, its core is drawn downward and moves the lever a certain distance about its pivot 137. This movement permits the cores of the magnets $V^2$ and $V^3$ to drop a shorter distance than the core of the magnet $V'$, owing to their position relative to the pivot of the lever. The magnet $V^2$ is next excited, and produces an additional movement of the bell crank lever. Finally the magnet $V^3$ is energized, and its core pulled downward to move the valve V to entirely open the port 132. As shown in Fig. 5, the cores of the electromagnets move different distances. The core of the magnet $V^3$ having the greatest length of movement, it thereby increases the angle through which the bell crank lever is rotated. The governor G serves to lift the cores of the electromagnets when the latter are deënergized.

Referring to Figs. 2 and 3, I have shown a magneto O adapted to furnish current for the sparking coils of the engine E. The shaft of the magneto O is geared to the governor shaft by means of intermeshing gear wheels 147 and 148 secured to the shaft of the magneto, and the governor shaft 140, respectively. The distributer 149 and the spark advancer or timer T may be of any well known or approved construction. An electromagnet $T'$ is connected to the timer to operate same as will be described later.

When the electromagnet T' is excited, the timer is operated into position to advance the sparks, that is, the sparks in the combustion chambers of the engine are each produced slightly in advance of the working stroke of the piston.

The steering mechanism shown in Figs. 1, 16, 17, 18, 19 and 20 will now be described. The steering wheel 150 is secured to the upper end of the steering shaft 151, journaled in the standard 154. The lower end of the shaft 151 extends into, and is rotatable in, a cup-shaped member 152, formed on the upper end of a shaft 153. Secured to the shaft 151 immediately above the member 152 is a switch lever 160. This switch lever carries two insulated contacts 161 and 162 movable into engagement with the switch contacts 163 and 164, respectively. The contacts 163 and 164 are carried by, but electrically separated from the member 152, and also form stops to limit the movement of the switch lever independently of the shaft 153. Centering springs 165 and 166 serve to normally hold the switch lever in an intermediate position with the switch contacts separated. The shaft 153 has secured thereto, as shown in Fig. 1, a beveled pinion 155 meshing with a vertically disposed beveled gear 156. The small electric motor N is provided with a spur pinion 158 on one end of the motor shaft meshing with a spur gear 157 secured to or formed integral with the beveled gear 156. The opposite end of the motor shaft is provided with a worm 167 meshing with a worm gear 168. A crank arm 169 secured to the shaft of the worm gear 168 so as to rotate therewith is connected by a link 170 to a lever 171 secured to a vertical pin 172. The wheel 173 of the automobile is also secured to the pin 172 for rotation therewith about a vertical axis in steering the machine. A rod 174 connects the lever 171 with a crank arm 175 which serves to always maintain the front wheels parallel. The motor N is preferably a series motor, and, as shown in Fig. 20, is provided with two oppositely wound field coils 176 and 177, so that when current is supplied to the motor through one of these coils it will operate in one direction, and when current is supplied through the other field coil the direction of rotation will be reversed. It will be seen that when the motor N is rotated it operates through the worm gear and other connections to move the front wheels of the machine about vertical axes, in a direction depending upon the direction in which the motor is running. The motor at the same time drives the gears 158, 157, 156 and 155, thereby rotating the shaft 153.

The operation of the steering mechanism will be understood from the following description: When the operator desires to change the course of the machine he rotates the steering wheel 150 to the left, for example, to bring the contacts 161 and 163 into engagement, and thereby completes a circuit from the generator M, through the motor N. This circuit may be traced from the brush 178, through conductors 179 and 180, switch contacts 161 and 163, field coil 176, through the armature of the motor N, and through conductors 181, 182 and 183 to the opposite brush 184 of the generator M. The motor N therefore receives current and operates as above described, to turn the front wheels of the machine. The shaft 153 is rotated at the same time, so that the contacts 161 and 163 will again be separated, unless the operator continues to rotate the steering wheel to follow the shaft 153. As long as sufficient turning power is exerted at the steering wheel to keep the contacts 161 and 163 in engagement, the motor N will continue to rotate, and as soon as the steering wheel is stopped the circuit will be opened and the motor stopped. It will thus be seen that the operator can steer the machine by exerting only sufficient power to rotate the shaft 151 and keep the switch contacts in engagement. By turning the steering wheel in the reverse direction, the contacts 162 and 164 will be brought in engagement to supply current to the motor through the field coil 177, and thereby operate the motor in the reverse direction. If the motor N should at any time be out of order, the steering mechanism may be operated manually. In this case when the operator rotates the steering wheel, the switch arm 160 serves to drive the shaft 153, and therefore the gearing shown in Fig. 1 drives the motor by manual power, the motor operating in turn as when electrically driven to steer the machine.

Associated with the steering apparatus is the manually operable electric controller L, which, as shown diagrammatically in Fig. 20 is adapted to control the electrical circuits for the various electromagnets used in connection with the present invention. As shown in Fig. 16, the upper end of the standard 154 has secured thereto, or formed integral therewith, a casing or box 185 for the controller. A cover 186 for this controller box, forms a bearing for the steering wheel and shaft. Within the controller box 185 is secured a stationary cylindrical insulating sleeve 185'. A series of arc-shaped electrical contacts 191, 192, etc., are secured in this insulating sleeve, with their inner surfaces flush with the inner surface of the sleeve. Mounted for rotation about the shaft 151 is a cylindrical block 189 of insulating material rotatable within the sleeve 185'. This cylindrical block 189 may be rotated by means of the controller lever 187 which has a hub 188 surrounding the shaft 151, and secured to the insulating block. A series of movable contacts, which are preferably in the form of small cylindrical blocks 195 of carbon, or other electrical conducting material, are supported in recesses formed in the insulating block 189, and are yieldingly held by means of coil springs with their outer faces bearing against the insulating sleeve 185' or the contacts carried thereby. The contacts 195 are all electrically connected together by a conductor 195' connected to a spring-pressed contact 198 located in the lower end of the block 189. The contact 198 bears, at all times, against a stationary ring 197 of conducting material located in the lower end of the controller box, and insulated therefrom by a ring 197' of insulating material. Surrounding the controller box is an outer sheath or casing 250, which has an enlarged portion 251 forming a space in which are located sections 200 and 200' of resistance material. These resistances are connected in series in the circuit for the electromagnet B controlling the brake mechanism. A cable 196 carrying a plurality of insulated conductors extends upward through the standard 154, and the conductors are connected respectively to the several arc-shaped contacts 191, 192, etc., one of said conductors 201 being connected to the contact ring 197. It will be seen that with the above-described construction, when the controller lever 187 is rotated in either direction, the contacts 195 will be carried into engagement with the stationary contact strips in the sleeve 185'. The period at which each stationary contact is engaged by a contact 195 when the controller lever is operated, depends, of course, upon the position of the stationary contact. The position, location, and size of the various contacts will readily be understood from a consideration of the diagrammatic illustration in Fig. 20. In this figure the contacts are shown as concentrically arranged for the sake of clearness of illustration. The principle of operation, however, is the same as with the actual construction employed, and will be readily understood from the diagrammatic view.

The small electric generator M is provided to supply current for operating the various electromagnets. This generator may be located in any convenient position, and is connected in any suitable way to the engine E, so that the generator M is running whenever the engine E is in operation. As shown in Fig. 1, a driving belt or chain 197 connects the generator with the shaft 3. This generator, as shown in Fig. 20, is a shunt-wound machine having a shunt field coil 198. A switch 199 may be provided to disconnect the generator from the various circuits leading therefrom whenever desired.

The system of electrical circuits, as shown in Fig. 20, will be best understood in connection with the general statement of the operation of the machine, which is as follows:—Assuming that the controller lever 187 is in its central position as shown, and that the engine E has been started, the speed of the engine will be normal, controlled by the governor G. The pump shaft 3 being connected to the engine shaft, the pump will be running with the valve mechanism in the position shown in Fig. 8, so that there is a free circulation of the liquid within the pump, and no pressure is transmitted to the fluid motor F. The latter is therefore at rest. The clutch mechanism is also in the position shown, so that no power is transmitted directly from the pump shaft to the driving axle; the brakes also are applied at this time. If the operating lever of the controller or master switch is now moved, for example in a clockwise direction as viewed in Fig. 20, it will first engage successively a series of contacts 191' connected by resistance coils 200. This establishes a circuit from the generator M through the brake magnet coil as follows:—from the commutator brush 178, through the contact 179, switch 199, conductor 201, contact ring 197, switch lever 187, contact 191', resistance coils 200, contact segment 191, conductor 202, coil of the brake magnet B, conductor 203, switch 199, and conductor 183 to the other brush 184. The brake coil will now receive current which is reduced by the resistance 200, so that the brakes are only partially released. As the resistance 200 is gradually cut out of circuit, the brake magnet B receives a heavier current and becomes energized sufficiently to entirely release the brakes. The controller lever next engages a contact segment 204, and establishes a circuit through the winding of the electromagnet R'. As all the circuits through the controller may be traced from the brush 178 through the conductors 179 and 201 to the ring 197 and controller lever, these circuits need only be traced from said lever to the brush 184. The circuit for the magnet R' continues from the controller lever through contacts 204, wire 205, coil of electromagnet R', to the conductor 203, and from thence to the brush 184. The electromagnet R' now receives current and moves the reversing valve to the left-hand position as shown in Fig. 9. The controller lever next engages the contact strip 192, and completes the circuit through said contact strip, conductor 206, coil of electromagnet T' and conductors 207, 182 and 183 to the brush 184. The electromagnet T' now operates the timer T. The controller lever next engages the contact strip 208, and establishes a circuit which may be traced through the contacts 208, 208', conductor 209, coil of the electromagnet P', and from thence to the brush 184. The electromagnet P' now operates as before described in connection with Fig. 8 to close the by-pass for the first pair of pump gears 6 and 6', so that the latter will operate to force the liquid through the passage 14 and past the check valve 16 into the pressure chamber 15, thereby producing pressure in said chamber. The liquid 17 is therefore forced through the pipe 39, reversing valve and pipe 40 to the motor, and is distributed to the several sections $a$, $b$, $c$ and $d$ of the motor. The liquid under pressure operates the motor as before described, the exhaust fluid being conveyed back to the pump through the pipe 41, reversing valve R and pipe 42, and discharges from the latter into the discharge chamber of the pump. As the liquid at this time circulates only through the first compartment of the pump, only a small amount will be conveyed to the motor F, and as this liquid is distributed in parallel to the four sections of the motor, the latter will only operate very slowly, so as to start the automobile and run it at its slowest speed. When the controller lever is moved one step farther, the circuit is completed through the contacts 210, and 210', conductor 211, and winding of electromagnet $P^2$, in parallel with the circuit through the first magnet P'. The magnet $P^2$ operates the valve for the second section of the pump, and increases the volume of liquid delivered by the pump, so that the speed of the fluid motor F, and therefore of the automobile, is increased. The continued movement of the controlling lever in like manner closes the circuits for the electro-magnets $P^3$, $P^4$, and $P^5$, successively, to effect the operation of the corresponding pump sections, so that the volume of liquid delivered by the pump is gradually increased, resulting in a corresponding increase in the speed of the machine. The controller lever next engages the contact 215, and establishes a circuit which may be traced from said contact through conductor 216, winding of electromagnet F', through conductor 203 and from thence to brush 184. The magnet F' being excited moves the valve 60 from the position shown in Fig. 12 to that shown in Fig. 13, to cut off the supply of fluid to the section $b$ of the motor F, as before described, so that all the fluid supplied by the pump is forced to circulate through the sections $a$, $c$ and $d$, thereby increasing the speed of the motor F. The controlling lever next engages the contact 217, and completes a circuit through conductor 218, and coil of the magnet $F^2$, the latter operates its valve mechanism to cut off the supply of fluid to the section $a$ of the fluid motor, so that the fluid is now all forced to circulate through the sections $c$ and $d$. This brings the motor F up to its highest speed. The speed of the shaft 96 driven by the motor F is now substantially the same as that of the pump shaft 3. The controller lever next contacts the segment 193 and thereby establishes a circuit through the conductor 218 and coil of the clutch magnet $K^3$. The clutch mechanism is therefore operated in the manner already explained to disconnect the fluid motor F, and connect the pump shaft 3 directly with the shaft 96 to drive the machine independently of the motor F.

At substantially the same time that the controller lever engages the contact strip 193, to operate the clutch mechanism, it leaves the contacts 208, 210, 212, 213, 214, 215 and 217. The corresponding magnets are therefore deënergized, and the pump valves operated to a position to permit free circulation of fluid within the pump. The valves in the fluid motor are also returned to their initial position. The continued movement of the controller lever closes circuits through the contacts 219, 220 and 221, thereby establishing circuits through the windings of the magnets V', $V^2$, $V^3$, respectively. These magnets operate to gradually open the valve V to increase the supply of fuel to the motor, thereby increasing the speed of the engine E, and bring the machine up to its highest speed. The controller lever is now in its extreme left-hand position, and is held from further movement by a stop 222.

The speed of the machine may be reduced by moving the controller lever back toward central position, the magnets $V^3$, $V^2$, and V' being successively deënergized to effect a reduction in the speed of the prime mover. The next step is the deënergization of the clutch magnet, and the operation of the pump and fluid motor valves, whereby the fluid motor is brought into operation at its high speed, and the direct drive from the engine to the driving axle disconnected. As the controller lever moves off the contacts 217 and 215, the electromagnets $F^2$, and F' are deënergized, and thereby reduce the speed of the fluid motor. The continued movement of the controller lever successively deënergizes the electromagnets $P^5$, $P^4$, $P^3$, $P^2$ and P', this gradually cutting off the power supplied to the driving axle. The machine will now be permitted to come to rest. If the lever is moved back to its central position the brake magnet is gradually deënergized to apply the brake. The controlling lever may be left in any intermediate position to maintain the machine at a corresponding speed. It should be understood that during these controlling operations, the engine E is running continuously, and at a substantially constant speed, except when the speed is increased by the operation of the electromagnets V', $V^2$ and V³. This arrangement is of great practical importance in securing an efficient operation of the prime mover, and enabling the full power to be utilized in starting the machine, or running the same at a slow speed. The usual annoyance, waste of time, and labor involved in starting the prime mover every time the machine is started is also obviated.

Another improvement in the present arrangement is involved in the means for controlling the brake mechanism and power supplied from the prime mover. As the prime mover, which is preferably a gasolene engine, runs at a practically constant speed while under the control of the governor G, the generator M maintains a substantially constant voltage, so that it is possible with the combination of variable speed transmission gear and brake mechanism to control the brake in conjunction with the control of the transmission gear, and also independently of the transmission gear. The generator M always supplies power to control the brake mechanism, whether the machine is being driven at a slow or high speed, and also when no power is being supplied to the machine. This would not be possible with the usual arrangement in which it is necessary to slow down the prime mover in order to run the truck at slow speed, as in such case if the generator were used to supply power for the brake mechanism, the voltage would drop as the prime mover was slowed down, so that the current would not be strong enough to operate the brake. The present form of the brake apparatus and its combination with the speed controlling devices is also of importance, as it enables the brake mechanism to be used as a speed controlling device, when the power transmission gear is disconnected from the driving axle. For example, when the machine is going down a hill, the controlling lever may be moved into position to deënergize the magnets P', etc., so that no power is supplied to the driving axle, and by varying the position of the controlling lever more or less of the resistance 200 is inserted in the brake magnet circuit, and the brakes applied with greater or less power, and the machine thereby controlled.

If it is desired to run the machine backward, the controlling lever 187 is moved in a counter-clockwise direction, (Fig. 20). The lever first engages the contacts of the brake magnet circuit, and gradually short-circuits the resistance 200' to release the brake mechanism. When the lever engages the contact strip 204' a circuit is established through the electromagnet R², which then operates to move the reversing valve to its right hand position, so that the circulation of the fluid through the motor F will be in the reverse direction. A further movement of the lever 187 in this direction closes circuits through the contacts 208', 210', etc., in the same order as the corresponding contacts are engaged when the controller lever is moved in a direction to accelerate the machine in the forward direction. A stop 222' is provided to prevent the controller lever from being moved beyond these contacts, as in practice it is never required to run the machine backward at a higher speed than may be obtained by driving through the fluid motor. Ordinarily the lever 187 need not be moved farther to the right than into position to engage the contact 208', or contact 210'.

The relative arrangement of the steering wheel 150 and controlling lever 187 is such that the operator can conveniently steer the machine at the same time that the speed is being changed or controlled. As the motor N may receive current from the generator M, whether the machine is moving fast or slow, ample power is supplied at all times to operate the steering mechanism.

An important feature of the present invention resides in the use of electromagnets for operating the various speed controlling devices, so that the entire control of the machine is accomplished by means of the electrical controller, and also the electrical means for steering the machine. It should be remembered also that the various valves, including the reversing valve, the valves controlling the pump, and the valves in the fluid motor F, are balanced, or that little power is required to operate them. The electromagnets therefore form a convenient, practical and effective means for controlling the valves.

It will be understood from the foregoing description that the present invention involves the combination with a gasolene or other internal combustion engine adapted to run at a practically constant speed, of fluid power transmission mechanism constituting a variable speed gear, and valve mechanism associated therewith for regulating and controlling the speed gear, and an electrical control system associated therewith for controlling the power transmitted and the speed of the driven mechanism. The fluid power transmission mechanism comprises a pump and a fluid motor, the particular forms of which may be greatly varied, but which preferably each comprise a rotatable shaft, or as defined in the claims, a rotatable or a rotary member. The pump shaft operates either rotary members as shown, or reciprocating elements to effect a circulation of liquid, and the motor shaft may likewise be rotated by either rotary elements or reciprocating pistons driven by the fluid supplied from the pump.

The present invention may be adapted for various uses by such changes and modifications as are within the skill of the ordinary mechanic, and it is to be further understood that various changes in details of construction, and the arrangements of parts might readily be made by those skilled in the art, without departing from the spirit and scope of the invention. I wish therefore, not to be limited to the particular construction herein set forth.

What I claim as new, and desire to secure by Letters Patent, is:—

1. In a variable speed gear, the combination with a pump, of a fluid motor driven by said pump, and balanced slide valves, the motor and valves being constructed and arranged to vary the amount of surface exposed to the motive fluid, and electromagnetic means for operating said slide valves.

2. In a variable speed gear, the combination with a pump, of a fluid motor driven by said pump, means for conveying fluid from the pump to the motor to operate the latter, a balanced slide valve controlling the supply of fluid to the motor and operable to cut off communication between the pump and motor, and a by-pass associated with the motor and controlled by said slide valve, said by-pass and slide valve permitting the fluid to circulate within the motor independently of the pump when said slide valve is in a certain position.

3. In a variable speed gear, the combination of a pump, a fluid motor driven by said pump, balanced valves, the motor and valves being constructed and arranged to vary the amount of surface exposed to the motive fluid, electromagnetic means for operating said valve mechanism, and a by-pass controlled by said valve mechanism, and permitting the fluid to circulate within the motor independently of the pump when said electromagnetic means is energized.

4. In a variable speed gear, the combination with a pump, of a fluid motor, means for conveying fluid from the pump to the motor to operate the latter, means for returning the fluid from the motor to the pump, a by-pass associated with the motor and permitting circulation of the fluid within the motor, balanced valve mechanism controlling said by-pass and also controlling the passage of fluid from the pump to the motor, and an electromagnetic device for operating said valve mechanism.

5. In a variable speed gear, the combination with a pump, of a fluid motor driven by said pump, balanced valve mechanism operable to vary the quantity of fluid delivered by the pump and consumed by or passing through the motor, and electromagnetic means for operating said valve mechanism.

6. In a variable speed gear, the combination with a pump, of a fluid motor driven by said pump, a plurality of balanced valves, the motor and valves being constructed and arranged to vary the amount of surface exposed to the motive fluid, and electromagnetic devices for operating the valves.

7. In a variable speed gear, the combination with a pump, of a fluid motor driven by the pump, valves controlling the flow of fluid through the pump, independent balanced valves for controlling the flow of fluid through the motor, and electromagnetic devices for operating the valves.

8. In a variable speed gear, the combination of a pump, a fluid motor driven by the pump, balanced valves controlling the flow of fluid through the motor, and electromagnetic means for operating the valves, the motor and valves being constructed and arranged to vary the amount of surface exposed to the motive fluid.

9. In a variable speed gear, the combination with a pump, of a fluid motor driven by said pump, a plurality of balanced valves operable to control the passage of fluid through the pump, a plurality of balanced valves for controlling the passage of fluid through the motor, an electromagnetic device for actuating each of said valves, and controlling means for effecting the successive actuation of said electromagnetic devices.

10. In a variable speed gear, the combination with a pump, of a fluid motor driven by said pump, a plurality of balanced valves controlling the flow of fluid in the pump, and operable into position to permit the fluid to circulate within the pump, electromagnets for operating said valves, a plurality of valves controlling the flow of fluid through the motor and operable into position to permit the fluid to circulate within the motor, and electromagnets for operating said last-named valves.

11. The combination with a pump, of a fluid motor adapted to be driven by said pump, a plurality of balanced valves associated with the pump, electromagnets connected to said valves for moving the latter into position to permit the fluid to be driven from the pump and through the motor when said electromagnets are energized, a plurality of valves associated with the motor, electromagnets operatively connected to said last-named valves, the latter being movable into position to permit the fluid from the pump to drive the motor when said last-named magnets are deënergized.

12. The combination with a pump, of a fluid motor adapted to be driven by said pump, a plurality of balanced valves associated with the pump, electromagnets connected to said valves for moving the latter into position to permit the fluid to be driven from the pump and through the motor when said electromagnets are energized, a plurality of valves associated with the motor, electromagnets operatively connected to said last-named valves, the latter being movable into position to permit the fluid from the pump to drive the motor when said last-named magnets are deënergized, and controlling mechanism for effecting the successive operation of all of said electromagnets.

13. In a variable speed gear, the combination with a pump, of a fluid motor driven by said pump, a plurality of balanced valves, controlling the flow of fluid through the pump, a plurality of balanced valves controlling the flow of fluid through the motor, electromagnets for operating said valves, and a manual controlling device operable to successively close the circuits for said electromagnets to effect a step by step operation of the valves.

14. In a variable speed gear, the combination with a pump, of a fluid motor adapted to be driven by fluid supplied from the pump, valve mechanism associated with the pump and motor and operable to vary the volume of fluid supplied by the pump and to vary the quantity consumed by or passing through the motor, electromagnetic devices for operating the valve mechanism, means for supplying electric power to said electromagnetic devices, and controlling mechanism manually operable to successively control the electromagnetic devices to effect their successive operation.

15. In variable speed mechanism, the combination with a pump, of a fluid motor comprising a rotary element, operable by fluid supplied from the pump, a plurality of valves controlling the flow of fluid through the pump and motor, electromagnets operatively connected to said valves, a source of current supply, circuits connecting said source of supply with the electromagnets, and circuit controlling mechanism operable to effect the successive energization of the electromagnets.

16. The combination with a driving member, of a driven member, fluid operated power transmission mechanism intermediate of said members, means for controlling the circulation of fluid within said transmission mechanism at the will of the operator for varying the speed of the driven member relatively to that of the driving member, and electromagnetically controlled mechanism for coupling said members for operation as a unit independently of said first-named controlling means, said last named mechanism being operable only when the driven member has been brought by said transmission mechanism to a predetermined speed relative to the driving member.

17. The combination with a rotary driving member and a rotary driven member, of fluid operated power transmission mechanism intermediate of said members for rotating the driven member from the driving member, means for controlling the circulation of fluid within said transmission mech- anism to vary the relative speed of said members, means for coupling said members for rotation as a unit, and electromagnetic apparatus for operating said coupling means, said apparatus being operable only in a predetermined order with respect to the operation of said controlling means.

18. The combination with a rotary driving member and a rotary driven member, of a variable speed gear comprising a pump and a fluid motor, a fluid driven by the pump and adapted to drive the motor, means for varying the volume of fluid delivered by the pump and thereby varying the speed of the motor, means for coupling said members to rotate as a unit independently of said speed gear, and electromagnetic means for actuating the coupling means.

19. The combination with a rotary driving member and a rotary driven member, of a variable speed gear interposed between said members and comprising a pump and a fluid motor, a fluid driven by the pump and adapted to drive the motor, means to vary the volume of fluid delivered by the pump and thereby vary the speed of the motor, means operable when said members have been brought to substantially the same speed of rotation to couple said members for rotation as a unit, and electromagnetic mechanism controlling the said coupling means.

20. The combination with rotary driving and driven members, of variable speed transmission mechanism interposed between said members and comprising a pump and a fluid motor, a fluid driven by the pump and adapted to drive the motor, balanced valve mechanism operable to vary the volume of fluid delivered by the pump and thereby vary the speed of the motor, means for coupling the said members to rotate as a unit independently of said transmission mechanism, electromagnetic means for actuating said balanced valve mechanism, and additional electromagnetic means for operating said coupling means.

21. The combination with a driving member and a driven member, of a variable speed transmission gear interposed between said members and comprising a pump and a fluid motor, a fluid driven by the pump and adapted to drive the motor, means for varying the volume of fluid delivered by the pump and thereby varying the speed and torque of the motor, coupling devices operable to connect said members for operation independently of the variable speed gear, electromagnetic means for actuating said coupling devices, and means for controlling said electromagnetic actuating means at the will of the operator.

22. The combination with a driving member and a driven member, of fluid operated power transmission mechanism interposed between said members and comprising a pump and a fluid motor adapted to be driven by fluid delivered by the pump, valves associated with the pump and operable to vary the quantity and pressure of fluid delivered thereby, valves associated with the fluid motor and operable to vary the speed of the motor for a given quantity and pressure of fluid applied thereto, electromagnetic means for successively operating said valves, and an electromagnetically controlled mechanism for coupling said members for operation as a unit independently of the fluid transmission mechanism.

23. The combination with a driving member and a driven member, of a variable speed gear interposed between said members, and comprising a pump and a fluid motor, a fluid circulated by the pump and adapted to drive the motor, electromagnetic devices operable to control the speed of the motor, reversing valve mechanism controlling the direction of the operation of the motor, an electromagnetic device for operating the reversing valve mechanism, and a controller operable to open or close the electrical circuits for said devices in a predetermined order.

24. The combination with a driving member and a driven member, of means comprising a pump and a fluid motor operated by the pump for connecting said members to actuate the driven member by power supplied from the driving member through the pump and motor, means for varying the volume of fluid delivered by the pump thereby varying the speed of the driven member, brake mechanism connected with the driven member, electromagnetic means for operating said brake mechanism, and a controlling device operable to control said electromagnetic means and said speed varying means.

25. The combination with a driving member and a driven member, of a pump connected to the driving member, a fluid motor connected to the driven member and operated by fluid delivered by the pump, mechanism for varying the volume of fluid delivered by the pump and thereby varying the speed of the driven member, electromagnetic devices for operating said mechanism, brake mechanism associated with the driven member, electromagnetic means for operating the brake mechanism, and a controlling device operable to effect the successive operation of said electromagnetic devices and said electromagnetic means to gradually reduce the speed of the driven member and apply the brake mechanism.

26. The combination with a driving member, of a driven member, a variable speed gear connecting said members and comprising a pump and a fluid motor adapted to be operated by fluid supplied by the pump, valve mechanism controlling the supply of fluid from the pump, valve mechanism controlling the flow of fluid through the motor, clutch mechanism operable to connect the driving member and the driven member for operation independent of power supplied through the fluid motor, means to control the relative order in which the valve mechanism and clutch mechanism are operated, and electromagnetic means for operating said clutch mechanism.

27. The combination with a driving member and a driven member, of a variable speed gear interposed between said members and comprising a pump and a fluid motor operated by fluid delivered by the pump, valves connected with the pump, electromagnetic devices for operating said valves, valves controlling the flow of fluid through the motor, electromagnetic devices for operating said valves, clutch mechanism operable to connect the driving member and driven member for operation as a unit independently of power supplied through the fluid motor, electromagnetic means for operating the clutch mechanism, brake mechanism for the driven member, electromagnetic means for operating said brake mechanism, and a controlling device operable to effect the successive operation of said electromagnet devices and said electromagnetic means in predetermined order.

28. The combination with a driving member and a driven member, of variable speed mechanism connected to said members and comprising a pump and a fluid operated motor driven by fluid delivered by the pump, valves controlling the supply of fluid from the pump, valves controlling the flow of fluid through the motor, clutch mechanism operable to disconnect the fluid motor from the driven member and connect the latter to the driving member for operation independently of power supplied through the fluid motor, brake mechanism associated with the driven member, electromagnetic devices for operating said valves, clutch mechanism and brake mechanism, a source of electrical energy, circuits for supplying electric power therefrom for said electromagnetic devices, and a manually operable controlling device controlling said circuits and operable to effect the operation of the electromagnetic devices in a predetermined order.

29. The combination with an internal combustion engine, comprising a driving member, of a driven member, a variable speed gear interposed between said members and comprising a pump and a fluid motor, a fluid circulated by the pump and adapted to drive the motor, a plurality of independent valves associated with the pump and controlling the volume of fluid delivered thereby, a plurality of independent valves controlling the flow of fluid through the motor, an electric generator driven by the engine, and electromagnetic devices for operating said valves, said electromagnetic devices being operated by current supplied from the generator.

30. The combination with an internal combustion engine, of a pump connected to be driven thereby, a fluid motor adapted to be driven by fluid delivered by the pump, mechanism connected to and driven by said motor, means for regulating and controlling the flow of fluid to vary the speed and torque of the motor, an electric generator mechanically connected to said engine, and electromagnetic means operated by current supplied by said generator for controlling the speed of the engine.

31. The combination with an internal combustion engine, of a pump connected to be driven thereby, a fluid motor adapted to be driven by fluid supplied by the pump, mechanism connected to and driven by said motor, means for regulating and controlling the flow of fluid to vary the speed and torque of the motor, an electric generator mechanically connected to said engine, a device for controlling the speed of the engine, and a plurality of electromagnets operable successively by current supplied from said generator to operate said speed controlling device.

32. The combination with an internal combustion engine, of a pump connected to be driven thereby, a fluid motor adapted to be driven by fluid delivered by the pump, means for controlling the flow of fluid thereby varying the speed and torque of the motor, a device for controlling the speed of the engine, electromagnetic apparatus for operating said device, a source of electrical energy and circuits extending therefrom to said electro-magnetic apparatus, and a manually operable device for controlling said circuits.

33. The combination with an internal combustion engine, of an automatic speed governor controlling the supply of fluid mixture for operating the engine, a pump connected to be driven by the engine, a fluid motor operated by fluid delivered by the pump, driven mechanism connected to the motor, means for regulating and controlling the flow of fluid to vary the speed and torque of the motor, an electric generator connected to be driven by the engine and manually controlled electro-magnetic means actuated by current supplied by said generator for controlling the speed of the engine.

34. The combination with an internal combustion engine, of a pump connected to be driven thereby, a fluid motor adapted to be driven by fluid delivered by the pump, means for regulating and controlling the flow of fluid to vary the speed and torque of the motor, an electric generator connected to be driven by the engine, a timing device controlling the period at which the fluid for operating the engine is ignited, electromagnetic means for operating said timing device, and an electromagnetic device for controlling the speed of the engine, said electromagnetic means and said electromagnetic device being actuated by current supplied from said generator.

In testimony whereof, I have signed my name to this specification in the presence of two subscribing witnesses.

AUGUST SUNDH.

Witnesses:
 ROGER W. FLAGG,
 EDWARD H. STEELE.